United States Patent [19]

Piber

[11] 4,095,072

[45] June 13, 1978

[54] INDUSTRIAL SPEED CONTROL TRIGGER SWITCH WITH INTEGRAL REVERSING SWITCH

[75] Inventor: Earl T. Piber, Oconomowoc, Wis.

[73] Assignee: Cutler-Hammer, Inc., Milwaukee, Wis.

[21] Appl. No.: 710,922

[22] Filed: Aug. 2, 1976

[51] Int. Cl.² .......................... H01H 13/08; H02P 7/00

[52] U.S. Cl. .................................... 200/157; 200/1 V; 310/50; 318/345 R

[58] Field of Search ................. 200/157, 1 V; 310/48, 310/50, 68 R, 68 D; 361/381, 386, 387; 318/331, 345, 345 R

[56] References Cited

U.S. PATENT DOCUMENTS

| | | | |
|---|---|---|---|
| Re. 26,781 | 2/1970 | Frenzel | 200/157 |
| 3,260,827 | 7/1966 | Frenzel | 200/157 |
| 3,328,613 | 6/1967 | Gawron | 310/48 |
| 3,456,229 | 7/1969 | Matthews | 338/198 |
| 3,467,801 | 9/1969 | Matthews | 200/157 |
| 3,536,973 | 10/1970 | Matthews et al. | 318/345 |
| 3,543,1[illegible] | 11/1970 | Robertson | 318/345 |
| 3,632,936 | 1/1972 | Piber | 200/157 |
| 3,637,967 | 1/1972 | Braun | 200/155 R |
| 3,648,142 | 3/1972 | Corey et al. | 318/345 R |
| 3,761,788 | 9/1973 | Matthews et al. | 310/50 |

OTHER PUBLICATIONS

Arrow Hart, Inc.; "Trigger Speed Control Switch with Reversing and Trigger Lock", Photo Nos. 7262-1 to 7262-4.

*Primary Examiner*—James R. Scott

*Attorney, Agent, or Firm*—Hugh R. Rather; William A. Autio; Michael E. Taken

[57] ABSTRACT

An industrial grade trigger switch having an on-off switch and a resistor controlled speed control circuit both controlled by trigger depression, and characterized by a reciprocal button reversing switch integrally within the trigger, a heftier trigger, longer trigger travel, double-pole contacts for the on-off switch, higher current rating, larger heat sink area for the solid state current control element for continuous service, better dust proofing and double insulation.

15 Claims, 12 Drawing Figures

Fig. 5
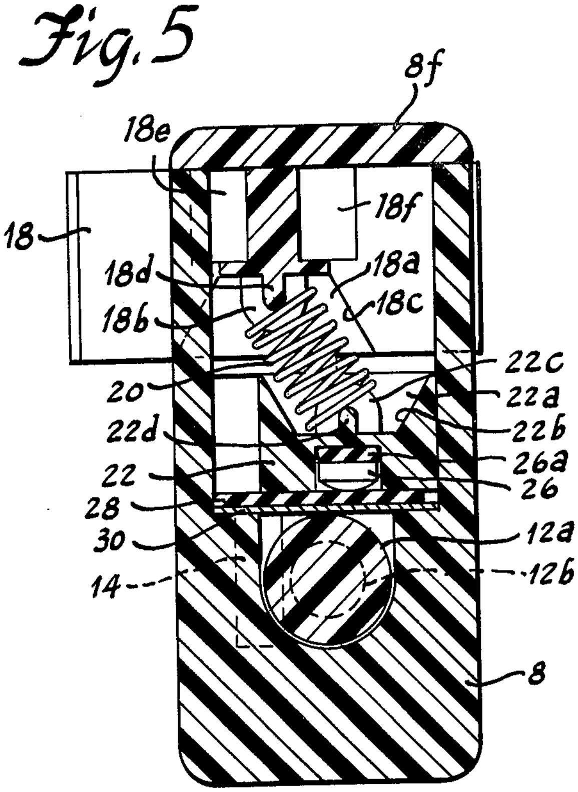
Fig. 6
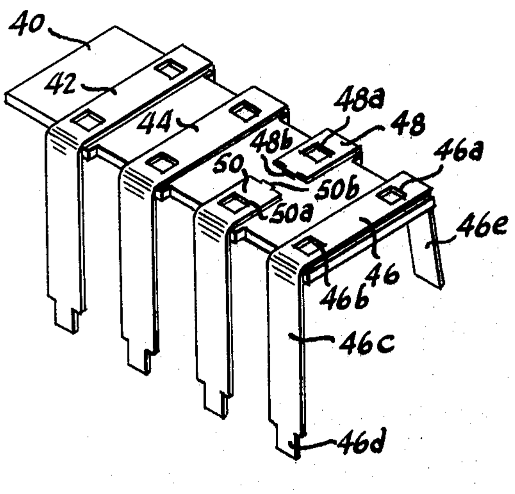
Fig. 7
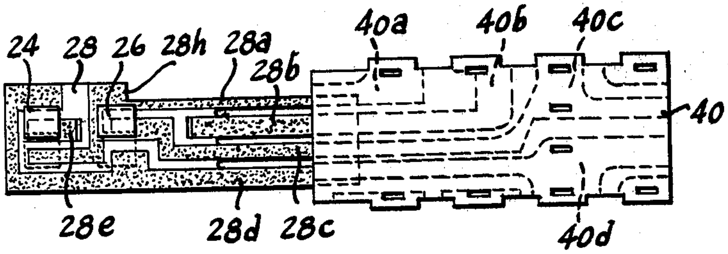
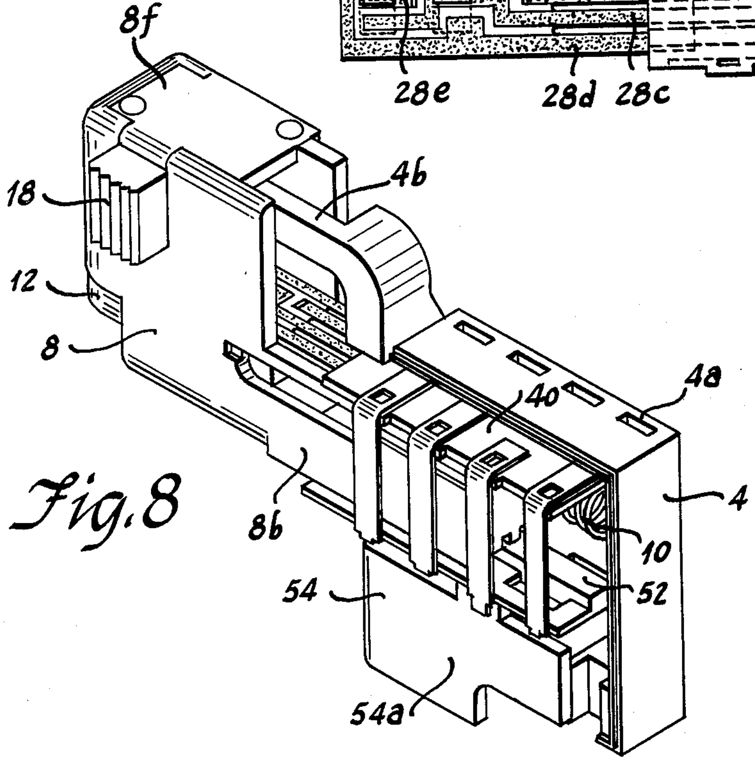
Fig. 8

INDUSTRIAL SPEED CONTROL TRIGGER SWITCH WITH INTEGRAL REVERSING SWITCH

BACKGROUND OF THE INVENTION

Speed control trigger switches with an integral reversing switch have been known heretofore. My Prior U.S. Pat. No. 3,632,936, dated Jan. 4, 1972, and assigned to the assignee of this invention, shows three versions of integral reversing trigger switches. This invention relates to improvements thereover affording a switch construction especially adapted for industrial applications.

SUMMARY OF THE INVENTION

An object of the invention is to provide a speed control trigger switch with an improved integral reversing switch.

Another object of the invention is to provide an improved speed control trigger switch especially adapted for industrial applications.

A more specific object of the invention is to provide a trigger switch with improved double-pole contacts and speed control parts affording a higher current rating.

Another specific object of the invention is to provide a speed control trigger switch with a housing having two halves bonded together thereby affording better dustproofing.

Another specific object of the invention is to provide a speed control trigger switch with a heftier trigger having longer trigger travel thereby providing a stronger, more massive switch for the larger industrial portable electric tools.

Another specific object of the invention is to provide a speed control trigger switch of the aforementioned type having no metal parts exposed thereby affording double-insulation when used in an insulated tool handle.

Other objects and advantages of the invention will hereinafter appear.

BRIEF DESCRIPTION OF THE DRAWINGS

FIG. 5 is a further enlarged vertical lateral cross-sectional view through the trigger taken along line 5—5 of FIG. 2 to show the integral reversing switch;

FIG. 6 is an enlarged isometric view of the printed circuit (PC) connector board of the switch of FIGS. 2, 3 and 8 with the connectors mounted thereon;

FIG. 7 is a top view of the PC connector board of FIG. 6 with the connectors removed and the reversing switch PC board and its movable contacts of FIGS. 2, 3 and 5;

FIG. 8 is an isometric view of the switch of FIG. 1 with the left half of the housing and the on-off switch stationary contacts removed to show the heat sink and substrate;

DESCRIPTION OF THE PREFERRED EMBODIMENT

Figure 1:
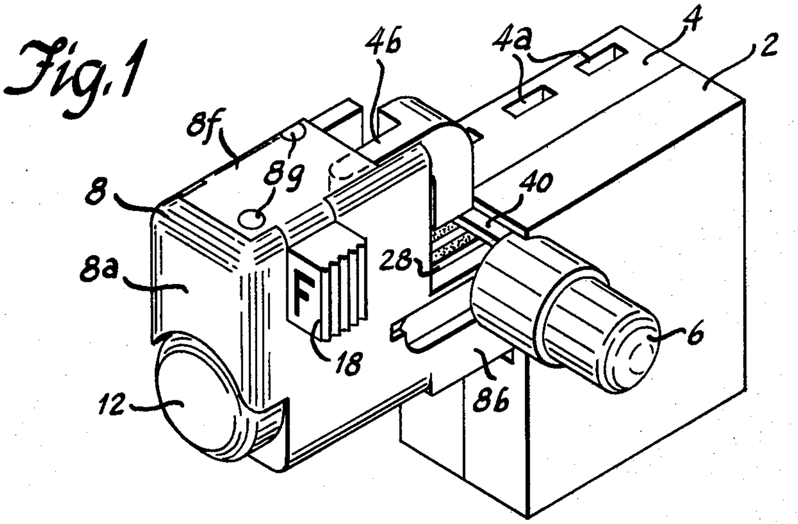
FIG. 1 is an enlarged isometric view of an industrial speed control trigger switch with integral reversing switch showing the left end of the laterally reciprocal reversing switch button, the variable stop button and the lock button.

Referring to FIG. 1, there is shown an industrial speed control trigger switch with integral reversing switch constructured in accordance with the invention. This switch comprises a housing 2 and 4, a lock button 6 and a trigger 8 mounted on the housing.

Figure 2:
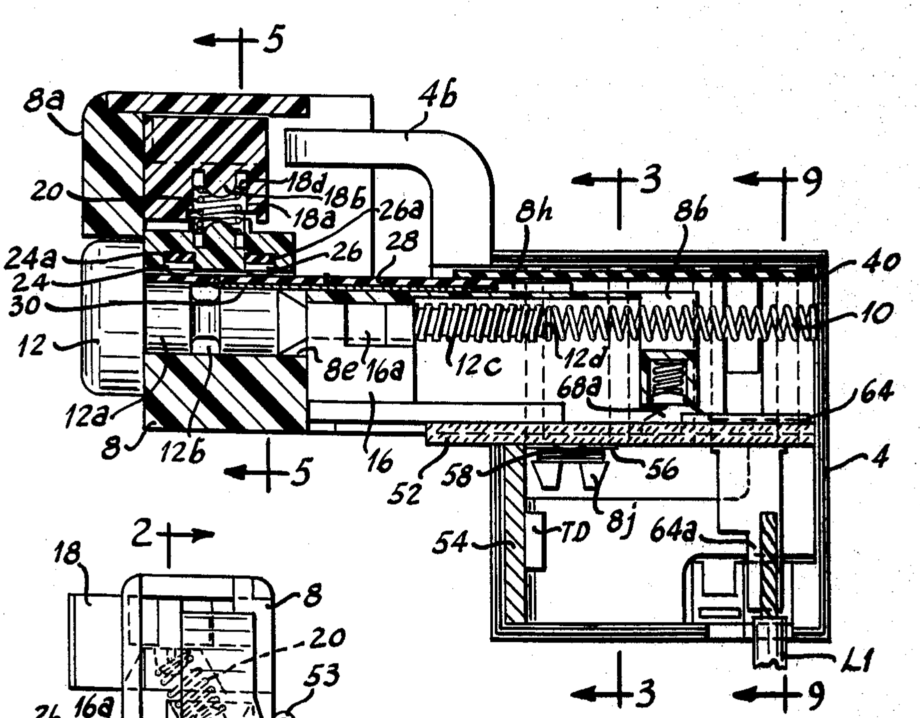
FIG. 2 is a further enlarged, vertical longitudinal cross-sectional view taken along line 2—2 of FIG. 3 to show the on-off switch, reversing switch, variable stop and heat sink.

This housing or base is made of two halves of insulating material including a left half 2 and a right half 4 rigidly secured together at their interfitting edges as by solvent bonding or the like. The right half has four slots **4*a* extending through its top wall for insertion of connectors into the base. An integrally molded interlocking finger 4*b* extends from the forward upper portion of the right half of the base. This interlocking finger extends first upwardly and then forwardly as shown in FIG. 2**. This forwardly extending part of this finger is reduced in lateral width to provide a narrower finger on the center line of the base for interlocking to prevent actuation of the reversing switch when the trigger is in "on" or depressed position.

Figure 3:
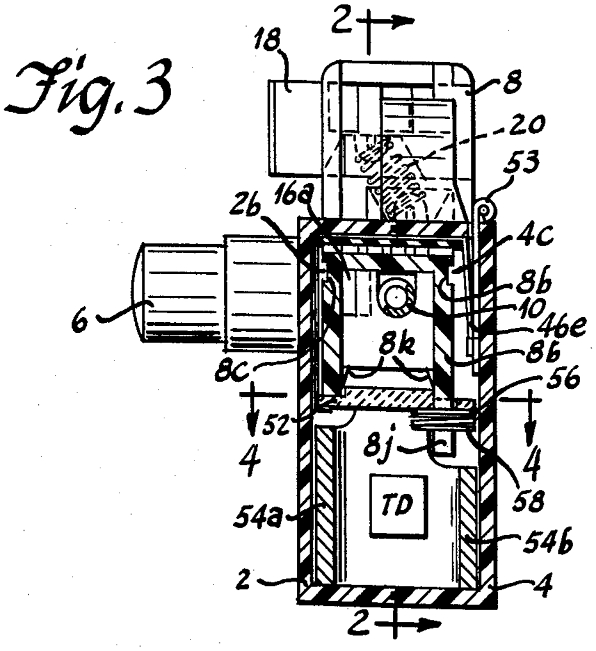
FIG. 3 is a vertical laterial cross-sectonal view through the switch housing taken along line 3—3 of FIG. 2 to show the variable stop, variable resistor, heat sink and connectors.
Figure 9:
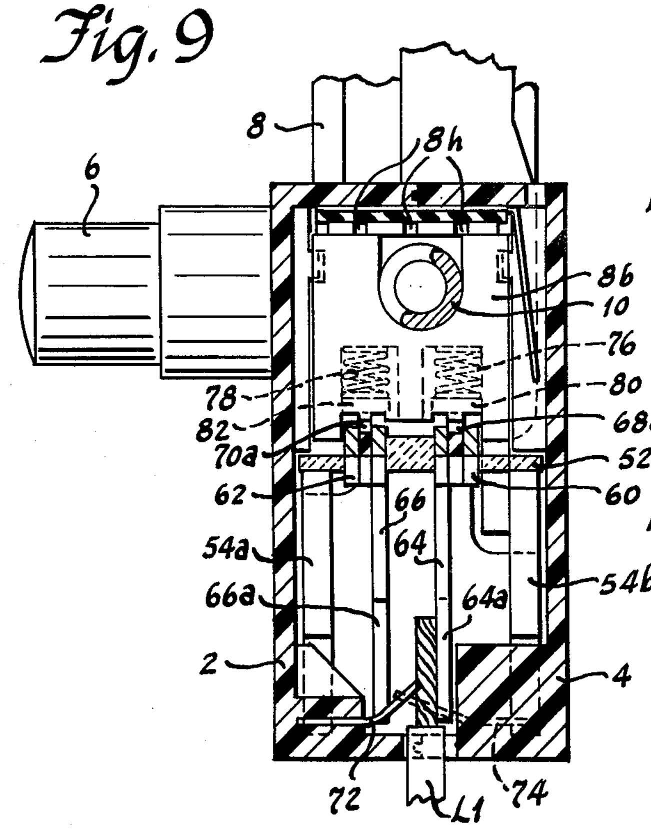
FIG. 9 is an enlarged vertical lateral cross-sectional view through the switch housing taken along line 9—9 of FIG. 2 to show the on-off contacts and connectors.

Trigger 8 is molded of insulating material and has a forwardly-extending finger-engaging portion **8*a* and a rearwardly-extending contact actuator, sliding portion 8*b* mounted for linear sliding movement in the upper portion of the housing as shown in FIG. 1. This trigger is spring-biased by a helical return spring 10 from the rear end of the base so that it will return to its "off" position when released as shown in FIG. 2. This trigger is limited in its forward movement by internal ribs 2*b*, 4*c* on the lateral walls of the housing that slide in grooves 8*c* and 8*d* in the left and right sides of the trigger and stop against the rear ends of these grooves as shown in FIGS. 3 and 9**.

This trigger is provided with a variable stop means. This means comprises a rotary stop button 12 defining the lower part of the forward, finger-engaging face of the trigger. An integral shaft **12*a* extends rearwardly from this button and is journaled in a complementary hole 8*e* in the trigger as shown in FIG. 2. This shaft is restrained from longitudinal movement by a key while permitting rotary movement. This key is a pin 14 that is pressed into a hole in the trigger so that it extends through one side of an annular groove keyway 12*b* in shaft 12*a* as shown in FIG. 2 and in broken lines in FIG. 5. Rearwardly of this keyway, the remainder of this shaft is a reduced diameter threaded section 12*c* that meshes with halfturn threads on a stop block 16. The extreme rear end of shaft section 12*c* is provided with a central boss 12*d* as shown in FIG. 2 for retaining the forward end of trigger return spring 10. This stop block 16 is provided with a recess or catch 16a in its left side having an undercut rear lip as shown by a dotted line in FIG. 3 for retaining the inner end of the lock pin when lock button 6 is pressed thereinto, this recess being best shown in FIGS. 2 and 3. Thus, when the trigger is depressed, the lock button can be pressed to cause the end of the lock pin to enter recess 16a, and release of the trigger causes the lock pin to catch on the undercut rear lip of this recess to lock the trigger in such speed control position. Rotation of variable trigger-stop button 12** allows vernier adjustment of the trigger while the lock is engaged. A slight depression of the trigger allows the lock button spring to return the lock button and the stop pin to normal disengaged position.

The aforesaid trigger 8 is also provided with an integral reversing switch; that is, the reversing switch is completely built into the trigger. This reversing switch is provided with a manual operator in the form of a double-ended pushbutton 18 mounted for lateral reciprocal movement in the trigger. The left end of this pushbutton is shown in FIGS. 1 and 3 as extending out of the trigger since the right end, which is similar, has been pushed in. As indicated by the letter "F" in FIG. 1, pushing the right end of the pushbutton in sets the reversing switch for running the tool motor in the forward direction. Pushing the left end in will extend the right end out and at the same time will set the reversing switch for running the tool motor in the reverse direction. The right end of this pushbutton has an "R" to indicate this reversal.

The mechanism of this reversing switch is shown most clearly in FIGS. 2 and 5. Thus, pushbutton 18 is guided for the aforesaid reciprocal sliding movement by the apertures in the left and right sides of the trigger and is held therein by cover plate 8f. This cover plate is secured to the trigger by a pair of integrally molded cylindrical projections 8g extending through corresponding holes through diagonally opposite corners of the insulating cover plate and frictionally held therein.

This pushbutton 18 of the reversing switch is provided with a spring retainer. This consists of a lateral slot 18a extending up from the lower surface of this pushbutton and having a boss 18b extending down into the upper end of an helical compression overcenter spring 20 as shown in FIGS. 2 and 5. This slot is provided with laterally downwardly diverging sides 18c as shown in FIG. 5 to afford clearance for this overcenter spring 20 when the pushbutton is shifted to the left or right. A pair of ribs 18d forwardly and rearwardly from boss 18b to the respective vertical sides of slot 18a to provide a pivot for the upper end of the overcenter spring while the boss retains the spring in place.

The aforesaid integral reversing switch also comprises a laterally reciprocal contact carrier 22, a pair of spring-biased movable contacts 24 and 26 carried thereby and stationary contacts in the form of a PC board 28 as shown in FIGS. 2, 5, 7 and 8. This contact carrier 22 is provided with a spring retainer in its upper surface like that in the lower surface of the pushbutton including a lateral slot 22a having laterally upwardly diverging sides 22b as shown in FIG. 5, a boss 22c and ribs 22d for retaining and pivoting the lower end of spring 20. This spring 20 is in compression between the pushbutton and contact carrier so that, when the pushbutton is moved overcenter to the right side, the spring snaps the contact carrier against the left wall of the housing and, when the pushbutton is moved back overcenter to the left side as shown in FIG. 5, it snaps the contact carrier against the right wall of the housing.

The aforesaid contact carrier 22 is provided with a pair of square slots in its lower surface for retaining movable contacts 24 and 26 and their respective bias springs 24a and 26a as shown in FIGS. 2, 5 and 7. These bias springs which may be resilient "silastic" pads bias the movable contacts down against the conductors on the upper surface of switching PC board 28 shown in FIG. 7.

Figure 12:
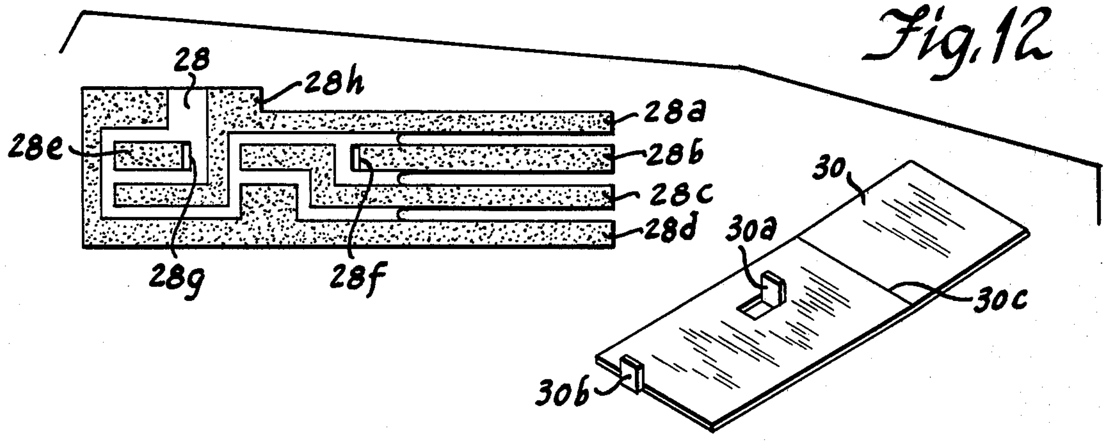
FIG. 12 is an enlarged exploded view showing the reversing switch PC board of FIG. 7 in top view and its underlying connector and bias spring in isometric view.

This switching PC board is shown most clearly in FIG. 12 along with its underlying combined leaf spring and connector 30. This PC board has four conductors 28a, 28b, 28c and 28d covering and extending from its four corresponding divided fingers at its right-hand end. This right-hand end is so divided for independent flexibility of the fingers to insure that each makes contact with the connector board 40 (FIGS. 2 and 6–8) hereinafter described. Conductor 28e on PC board 28 in FIG. 12 is connected to conductor 28d through underlying connector 30. For this purpose, sheared tabs 30a and 30b extend up through corresponding holes 28f and 28g in the PC board and are bent over on top, and may be soldered if desired, to make electrical connection with conductors 28b and 28e to connect them together. Combined leaf spring and connector 30 is made of BeCu (berrylium-copper) or the like for good electrical conductivity and good spring action and its right-hand end portion is bent slightly up at line 30c, as shown in FIG. 12, to provide an upward bias on the fingers of PC board 28 to maintain them in contact with connector board 40 at all times as shown in FIGS. 2, 5 and 7. This PC board is wider at its left end to provide a catch 28h at its right-hand side whereby it is locked in a complementary space within the trigger and prevented from sliding relative to the trigger when the trigger is actuated.

The manner in which the movable contacts connect the conductors of this PC board is shown in FIG. 7. Movable contacts 24 and 26 in their solid line position, which corresponds to the reverse position R of the reversing switch in FIGS. 1 and 5, connect conductors 28b–28e and 28d and connect conductors 28a and 28c, respectively, as shown in FIG. 7. When the pushbutton is shifted to its forward position F, movable contacts 24 and 26, in their dotted line position in FIG. 7, connect conductors 28a and 28b–28e and connect conductors 28c and 28d, respectively. Therefore, if the armature of a universal motor is connected across conductors 28b and 28c, and the field of this motor is connected between conductor 28a and one side of an electrical source and conductor 28d is connected to the other side of the source, it will be apparent that this switch can reverse the direction of current flow in the armature relative to the current in the field thereby to reverse the direction of motor rotation.

The trigger is provided with means for maintaining the four fingers of switch PC board 28 apart. This means comprises three integrally molded spaced apart ribs 8h along the top of sliding portion 8b of the trigger as shown in FIGS. 2 and 9. These ribs extend partly into the three spaces between the fingers of PC board 28 to the rear of leaf spring 30 and beneath connector board 40 to keep these fingers and the conductors thereon electrical separated and in correct alignment with the conductors on connector board 40. When the trigger is depressed, switching PC board 28 moves rearwardly with it and conductors 28a–28d thereof slidingly remain in contact with conductors on the lower surface of connector PC board 40 under the force of leaf spring 30.

This connector PC board 40 is shown in FIGS. 2, 6, 7 and 8.

A top view of this connector PC board is shown in FIG. 7 with the four printed circuit conductors on its lower surface being shown in broken lines. This includes conductors 40*a*, 40*b*, 40*c* and 40*d*. As shown in FIG. 7, conductors 40*a* -*d* are slidingly contacted by conductors 28*a*–*d*, respectively, of the switch PC board.

Figure 10:
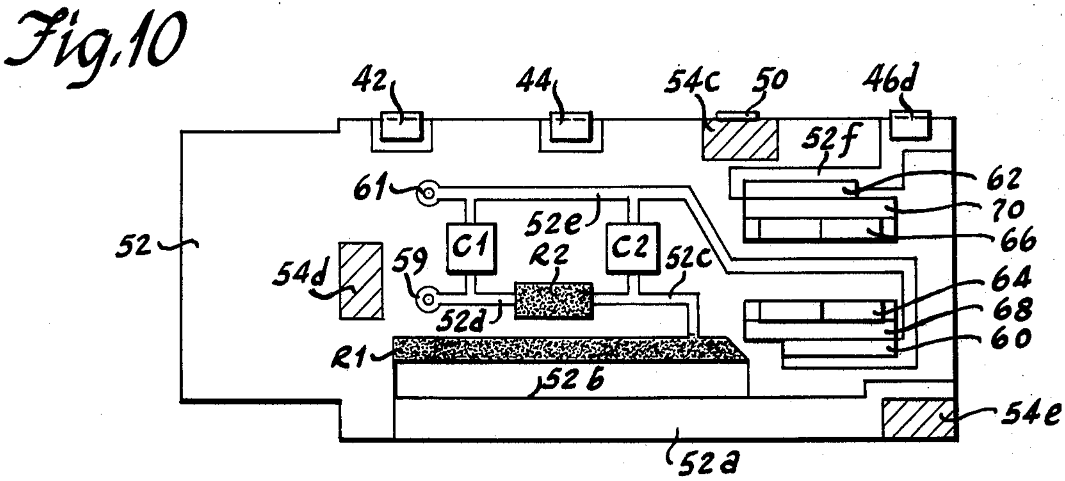
FIG. 10 is an enlarged bottom view of the substrate of FIG. 4 showing the printed circuit thereon comprising the speed control circuit of the switch.

The manner of mounting the five connectors 42, 44, 46 and 48 and 50 on connector board 40 is shown in FIG. 6. These connectors are made of electrically conducting material such as brass or the like. Conductors 42, 44 and 46 are alike and will be described in connection with connector 46. As shown in FIG. 6, connector 46 is made from a ribbon-like strip of metal having two spaced apart tabs 46*a* and 46*b* sheared to extend down from its horizontal midportion. These tabs are used to secure or both secure and electrically connect these connectors to the connector board and the printed circuit conductors. For this purpose, these tabs extend down through corresponding holes in board 40 and are bent over against the lower surface of the board. Left end 46*c* of connector 46 is bent down at 90° and has a reduced end portion 46*d* that is bent under the edge of substrate 52 as shown in FIG. 10 which is a bottom view of the substrate. Right end 46*e* of this connector forms the terminal to which an external wire terminal is connected by pressing it down through the appropriate hole 4*a* in the housing shown in FIG. 8. This terminal end 46*e* is shorter than the left end and is bent down to an angle of less than 90 degrees so that it will be biased to the right to provide pressure against an external terminal 53 that is inserted down through the rear hole in the housing, as shown in FIG. 3.

Connectors 42 and 44 are similar to connector 46 and therefore will not be described in detail. As shown in FIGS. 6 and 7, connector 42 is connected by its right-hand tab to printed circuit conductor 40*a* on the lower surface of this PC board. Connector 44 is similarly connected to conductor 40*b*. Connector 46 is merely mounted on this PC board 40 and serves only to connect the external wire terminal to the printed circuit on substrate 52 as shown in FIGS. 3 and 10.

Connectors 48 and 50 differ from the other connectors and from each other. As shown by FIGS. 6 and 7, connectors 48 and 50 are like connector 46 but broken at the middle and provided with additional tabs on each side of the break. Thus, connector 48 has a downwardly bent right end providing a terminal like terminal 46*e*, has a tab 48*a* like tab 48*a* and an additional tab 48*b* at its left end by which two tabs it is mounted on the PC board and also connected to conductor 40*c* of this PC board. Thus, connector 48 will serve to connect an external terminal to conductor 40*c* of the PC board. On the other hand, connector 50 has a downwardly bent left end with a reduced end portion like end portion 46*d* of connector 46. However, instead of being bent under the stubstate, this reduced end portion is left straight and is electrically connected, as by soldering, to the left plate of heat sink 54 shown in FIG. 8. This connector 50 has a tab 50*a* like tab 46*b* and an additional tab 50*b* at its right end by which two tabs it is mounted on the PC board and also connected to conductor 40*d* through the pair of holes shown in FIG. 7.

The aforesaid substrate 52 supports the speed control circuit on its lower surface as shown in FIG. 10 with the exception of the solid state Triac-Diac element TD which is supported on the heat sink as shown in FIGS. 2 and 3. This heat sink 54 is a large cooling capacity U-shaped plate having its center part against the front wall of the housing as shown in FIG. 2 and having its left and right side plates 54*a* and 54*b* extending rearwardly along the left and right walls, respectively, of the housing as shown in FIGS. 3, 8 and 9. Three short projections 54*c*, 54*d* and 54*e* extend up into notches in the substrate to support the latter as shown in FIG. 10. The Triac-Diac element TD is mounted on the heat sink so that terminal T2 in FIG. 11, sometimes called the anode, is electrically contacting the heat sink. Thus, the heat sink serves as the terminal T2 (FIG. 11) connection for the Triac for connecting this Triac to the speed control circuit on the substrate.

This substrate 52 shown in FIG. 10 has a thick film printed circuit shown by the strips. This circuit includes a conductor 52*a* that connects to the heat sink projection 54*e* at the lower right-hand corner. This conductor is connected by the movable slider 56 (FIG. 2) to resistor strip R1 is provide a variable resistor actuated by the trigger. As shown in FIGS. 2 and 3, a divided projection 8*j* extends down through elongated aperture 52*b* in the substrate. This aperture is elongated so that the divided projection can move therealong as the trigger is depressed. A thin rectangular bowed wiper 56 having a rectangular hole is inserted over this projection and an helical spring 58 is pushed up below the wiper. This divided projection may be pinched together and the spring cammed up and over the detents which will then retain it compressed against the wiper as shown in FIG. 2. This wiper is thus resiliently biased against and bridges conductor 52*a* and resistor R1 on the substrate to provide a variable resistor under trigger control.

Figure 11:
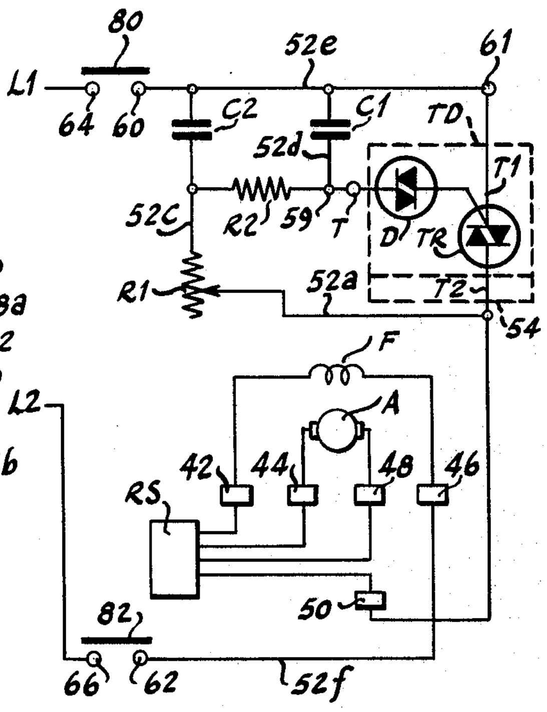
FIG. 11 is a schematic diagram of the speed control circuit of FIG. 10.

The printed circuit of substrate 52 also comprises a conductor 52*c* extending from resistor R1 to resistor R2 and capacitor C2. These same conductors are shown on the circuit diagram in FIG. 11. A conductor 52*d* extends from the other side of resistor R2 to capacitor C1 and to a terminal 59 from which a wire is connected to Diac D terminal T on the solid state element mounted on the heat sink, this connection being shown in FIG. 11. A conductor 52*e* extends in FIG. 10 from the other sides of capacitors C1 and C2 to on-off contact 60 of the on-off switch and also to terminal 61 from which a wire extends to the corresponding terminal T1 of the Triac TR in the solid state element as shown in FIG. 11. A conductor 52*f* extends from on-off contact 62 in FIG. 2 to the upper right-hand corner where it connects to the tip 46*d* of connector 46. With these connections there is provided the speed control circuit shown diagrammatically in FIG. 11 including reversing switch RS which reverses the current to armature A of the motor relative to the current in field F.

Each pole of the on-off switch includes a pair of stationary contacts, one of which has a terminal connected to a power line, and a bridging movable contact actuated by the trigger. As shown in FIGS. 2 and 9, inner generally T-shaped contact-terminal 64 of the right pole of the on-off switch and inner generally T-shaped contact-terminal 66 of the left pole thereof are similar except that they are relatively reversed so that their eccentric downwardly projecting terminals 64*a* and 66*a* are staggered, thus affording space for insertion of push-in wire leads without relative interference as shown in broken lines in FIG. 4. These contact terminals are retained from rising up by sharp bosses that bite into intermediate insulator and divider strips 68 and 70 which in turn are held down by similar sharp bosses on adjacent surfaces of outer contacts 60 and 62, respectively, that are secured to the substrate. A pair of resilient connector clips 72 and 74 are retained in oppositely-directed and forwardly offset horizontal slots in the housing as shown in FIG. 9 and the bare ends of the wires L1 and L2 are pressed in between these clips and the respective terminals 64a and 66a.

Figure 4:
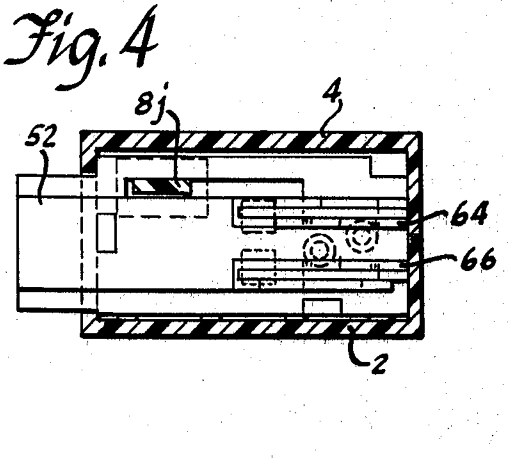
FIG. 4 is a horizontal cross-sectional view through the switch housing taken along line 4—4 of FIG. 3 to show the upper surface of the substrate including the stationary contacts of the double-pole on-off switch mounted thereon.

These outer contacts 60 and 62 are also generally T-shaped but shorter than the contact-terminals and their stems extend only slightly below the substrate and are staked thereto. To enable use of identical contacts 60 and 62 with the boss on the same side on each while providing sufficient clearance from resistor strip R3 on the substrate, the holes for these contacts are staggered on the substrate as shown in FIG. 10. Also, the stem of each such contact 60 and 62 is correspondingly offset with respect to the cross of its T. Thus, one contact 60 can be turned 180° to enable its boss to bite into the adjacent insulator 68 whereas the contacts above the substrate are in perfect alignment as shown in FIG. 4.

Insulator dividers 68 and 70 are similar and perform the dual function of spacing and insulating the contacts and also providing cams *68a* and *70a* for lifting the movable contacts from the stationary contacts as shown in FIGS. 2 and 9. Thus, each of these insulators has a stem extending down into the hole in the substrate between the associated contacts and has an uprising cam at its forward end between and beyond the forward ends of the associated stationary contacts. The remainder of this insulator rearwardly of these cams is below the level of the associated stationary contacts as shown in FIGS. 2 and 9 so as not to interfere with the movable contact engaging the same.

The movable contacts of the double-pole on-off switch are carried by the trigger. For this purpose, the rear end portion of the slidable part *8b* of the trigger is provided with two spaced pockets extending up from the bottom thereof, which pockets are square in cross-section. Each such pocket contains a helical compression spring 76 or 78 and a square movable contact 80 and 82, respectively, therebelow and biased downwardly by such compression spring against the stationary contacts.

With this arrangement of two pairs of stationary contacts, combined divider and cam members between the contacts of each such pair, and two movable contacts there is provided a double-pole bridging contact on-off switch. With the trigger in its forwardly-extended "off" position, movable contacts 80 and 82 are resting on the horizontal flats on top of the respective cams *68a* and *70a* above the level of and separated from the two pairs of stationary contacts as shown in FIGS. 2 and 9. As the trigger is depressed, the movable contacts slide down the rear slopes of these cams quickly to bridge the stationary contacts. The forward slopes on these cams raise the movable contacts to enable the trigger to be slid into place on assembly.

Further depression of the trigger causes wiper 56 (FIG. 2) to slide toward the rear to decrease the resistance of resistor R3 in circuit in FIGS. 10 and 11. As will be apparent in FIG. 11, closure of on-off contacts 80 and 82 causes A.C. power to be applied across the Triac and the motor in a circuit extending from line L1 through contact 80, terminals T1 and T2 of the Triac, connector 50, conductor *40d*, reversing switch RS, conductor *40b*, connector 44, armature A, connector 48, conductor *40c*, reversing switch RS, conductor *40a*, connector 42, field F, connector 46, and contact 82 to line L2. This causes the motor to run at a slow speed in either direction according to the position of the reversing switch. For this purpose, on each half-cycle current flows through resistors R1 and R2 to charge capacitors C2 and C1. When the charge on capacitor C1 reaches the tripping value of Diac D, it triggers into conduction sending a pulse of current into the gate of Triac TR to render the latter conducting. When the resistance of resistor R1 is reduced by trigger depression, the capacitors charge faster and reach the tripping value earlier on each half-cycle. Thus, Triac TR conducts for a longer period during each half-cycle applying more power to the motor. This increases the motor speed.

The variable stop can be used to set the speed of the motor. After the trigger has been depressed a certain amount, lock button 6 may be pressed so that the lock pin hooks into slot *16a* in stop block 16. Relaxation of the trigger then keeps the lock pin engaged. This stop block 16 is assembled into the trigger by inserting it up through an opening in the bottom of the trigger. This stop block is snapped past the catches *8k* shown in FIG. 3, one on each side of the opeing, and these catches then keep the stop block in sliding position within the trigger. Once the lock pin is engaged on the rear lip of the slot in the stop block, variable speed knob 12 can be turned for vernier adjustment of the motor speed. During this time, return spring 10 applies a forwardly directly force on the trigger. A slight depression of the trigger allows the lock pin to snap back free of the stop block whereafter the return spring will return the trigger to normal "off" position.

An interlock prevents actuation of the reversing switch when the trigger is in depressed position. For this purpose, projection *4b* enters one of the slots *18e* or *18f* shown in FIGS. 3 and 5, depending upon whether the reversing switch pushbutton is in its right or left position, thereby to prevent this pushbutton from being moved. However, in normal trigger position, projection *4b* clears these slots as shown in FIG. 2 so that the reversing switch can be operated.

While the apparatus hereinbefore described is effectively adapted to fulfill the objects stated, it is to be understood that the invention is not intended to be confined to the particular preferred embodiment of industrial speed control trigger switch with integral reversing switch disclosed, inasmuch as it is susceptible of various modifications without departing from the scope of the appended claims.

I claim:

1. An industrial trigger switch for mounting in the insulated handle of a portable electric tool comprising:

an insulating housing having a forward opening and wire apertures;

an insulating, spring-biased depressible trigger having a forwardly extending finger engaging portion and a slidable portion extending rearwardly through said opening into said housing;

interfitting means between said trigger and said housing limiting reciprocal movement of said trigger;

switching means in said trigger switch for selectively connecting an electric power source to the tool motor;

terminals for said power source connections and said motor connections accessible from the outside of said housing through said wire apertures to enable external conductors to be connected thereto;

a relatively large surface relatively thin heat sink contiguous to inner surfaces of three vertical outside walls of said housing;

controllable thyristor means mounted on said heat sink;

an insulating substrate mounted horizontally on the upper edge of said heat sink in said housing;

a speed control circuit mounted on said substrate and connected to said controllable thyristor means and comprising a variable resistor;

means coupling said slidable portion of said trigger to vary said variable resistor when said trigger is depressed;

said switching means comprising a double-pole on-off switch having bridging contacts including two pairs of stationary contacts mounted on said substrate and a pair of bridging contacts carried by said trigger for bridging the stationary contacts of the respective pairs thereof when said trigger is depressed, and each pole of said switch being connected to said terminals;

and no metal parts being exposed to the user when said trigger switch is mounted in the insulating handle of a portable electric tool.

2. The industrial trigger switch of claim 1, wherein: said insulating housing comprises two housing halves, each having an open side, and the two halves being connected together at the edges surrounding their open sides to provide a completely closed compartment therewithin except for said wire apertures and said forward opening which is filled by said trigger.

3. The industrial trigger switch of claim 1, wherein said switching means comprises:

a reversing switch mounted within said trigger and connected to said terminals and comprising a laterally reciprocal pushbutton for reversing the power connections to the motor.

4. The industrial trigger switch of claim 3, wherein: said reversing switch comprises a horizontally disposed printed circuit board mounted in said trigger and having reversing contacts at one end of its upper surface and conductors extending therefrom to the other end thereof;

and movable contacts controlled by said pushbutton to slide over said reversing contacts for reversing the current flow in a pair of said conductors.

5. The industrial trigger switch of claim 4, wherein: said reversing switch also comprises a horizontally disposed printed circuit connector board and means mounting the same in said housing and carrying said terminals for the motor connections;

and means biasing said other end of the trigger mounted printed circuit board agains the housing mounted printed circuit board to maintain electrical connections therebetween at all times while said trigger is moved.

6. The industrial trigger switch of claim 5, wherein: said means mounting said printed circuit connector board in said housing comprises connectors extending therefrom and connected to said substrate to support said printed circuit connector board within said housing.

7. The industrial trigger switch of claim 1, wherein: said switching means comprises a reversing switch mounted within said trigger and connected to said terminals and comprising a laterally reciprocal pushbutton for reversing the power connections to the motor;

said laterally reciprocal pushbutton comprising a pair of spaced recesses opening rearwardly and separated by a dividing wall;

and said housing comprises a forwardly extending interlocking member entering one or the other of said recesses in each lateral position of said pushbutton when said trigger is depressed thereby to prevent actuation of said reversing switch when said on-off switch is closed.

8. The industrial trigger switch of claim 1, wherein: said insulating substrate is mounted in said housing below said slidable portion of said trigger and has an elongated slot therein extending in the direction of trigger movement;

said speed control circuit is a printed circuit on the lower surface of said substrate;

said variable resistor is an elongated resistance coating adjacent said slot;

and said coupling means comprises an integral projection on said trigger extending through said slot and carrying a wiper for varying said resistance.

9. The industrial trigger switch of claim 1, wherein: said heat sink comprises a flat metal plate formed into a generally U-shaped configuration to hug the left, forward and right walls of said housing;

and a plurablity of projections formed integrally to extend up from the upper edge of said heat sink into corresponding notches in said substrate to support the latter and to connect said controllable thyristor means through said heat sink to said speed control circuit.

10. The industrial trigger switch of claim 1, wherein: said trigger includes a variable stop block mounted for longitudinal sliding movement therein;

a threaded shaft extending through said finger engaging portion of said trigger for moving said variable stop block, and said shaft having a knob at its forward end;

a spring-biased lock pin mounted on said housing for engaging said variable stop block to retain said trigger in a desired speed position;

and said knob being rotatable by the user for vernier adjustment of the motor speed.

11. The industrial trigger switch of claim 10, wherein: said trigger comprises an elongated opening in the bottom having resilient sides affording snap-in assembly of said stop block thereinto for adjustable movement, and an elongated slot in the left side for entry of said lock pin into engagement with said stop block in any adjusted position thereof.

12. The industrial trigger switch of claim 10, wherein: said insulating, spring-biased trigger comprises an helical compression spring between the rear end of said threaded shaft and the rear wall of said housing.

13. The industrial trigger switch of claim 1, wherein: said double-pole on-off switch comprises an insulator between the contacts of each said pair of stationary contacts, said insulator including a cam at its forward end positioned between the forward ends of the associated contacts for raising the associated movable contact off the stationary contacts when the trigger returns to its normal "off" position.

14. An industrial trigger switch for mounting in the handle of a portable electric tool comprising;

an insulating housing having a forward opening;

an insulating, spring-biased depressible trigger having a forwardly extending finger engaging portion and a slidable, contact-actuating portion extending rearwardly through said opening into said housing;

stationary contact means in said housing;

terminals for connecting power lines to said stationary contact means;

movable contact means carried by said slidable portion of said trigger for closing with said stationary contact means when said trigger is depressed;

a speed control circuit and means mounting the same within said housing;

said speed control circuit comprising a variable resistor;

said trigger comprising means for varying said resistor when said trigger is depressed to vary the speed of the tool motor;

load connector means in said housing comprising terminals for connecting the armature and field of the tool motor thereto and connectors for a reversing switch;

and an integral reversing switch in said trigger comprising:

a laterally reciprocal pushbutton mounted in said finger engaging portion of said trigger;

a printed circuit board mounted in said trigger and having reversing stationary contacts thereon and conductors slidably engaging said connectors of said load connector means to maintain this connection when said trigger is depressed;

a laterally reciprocal movable contact carrier and reversing movable contacts thereon in engagement with said reversing stationary contacts;

an overcenter compression spring between said pushbutton and said movable contact carrier responsive to actuation of said pushbutton into one lateral position for snapping said contact carrier into its opposite lateral position;

and variable stop means for said trigger for setting the speed of the motor.

15. The industrial trigger switch of claim 14, wherein said variable stop means for said trigger comprises:

a stop block having a catch in the left side thereof;

an elongated cavity within said trigger forming a slide for said stop block and having an opening at the bottom with the sides of said opening being dimensioned for an interference fit with said stop block for snap-in assembly of the stop block into said cavity and retention therein;

a spring-biased lock pin mounted on the left side of said housing opposite the path of movement of said stop block;

an elongated slot in the left side of said trigger affording access of said lock pin to said catch;

and means for adjusting the position of said stop block longitudinally in said cavity.

* * * * *